United States Patent [19]

Zwick

[11] Patent Number: 4,862,492
[45] Date of Patent: Aug. 29, 1989

[54] MEASUREMENT OF TRANSMISSION QUALITY OF A TELEPHONE CHANNEL

[75] Inventor: Nicholas Zwick, Denville, N.J.

[73] Assignee: Dialogic Corporation, Parsippany, N.J.

[21] Appl. No.: 262,975

[22] Filed: Oct. 26, 1988

[51] Int. Cl.$^4$ .................. H04B 3/46; H04M 3/32
[52] U.S. Cl. .................................. 379/6; 379/22; 379/32
[58] Field of Search .................. 379/6, 22, 23, 27, 32

[56] References Cited

U.S. PATENT DOCUMENTS 4,001,559  1/1977  Osborne et al. .................. 379/6

Primary Examiner—Stafford D. Schreyer
Attorney, Agent, or Firm—Michael B. Einschlag

[57] ABSTRACT

Apparatus and method for measuring the transmission quality of a telephone line, for example, a telephone line connected between two voice processing systems. The apparatus includes means for generating a predetermined sequence of DTMF pulses having predetermined amplitude values and for transmitting them over a telephone line; means for receiving DTMF pulses from a telephone line and determining the value of each pulse; means for counting the number of received DTMF pulses; and means for comparing the number with a predetermined threshold value, whereby the telephone line is determined to have acceptable transmission quality if the number exceeds the predetermined threshold value. Further, in a preferred embodiment, the predetermined sequence of DTMF pulses comprises four groups of ten (10) DTMF pulses, each of which groups has succeedingly lower amplitude.

12 Claims, 3 Drawing Sheets

"SENDING" SYSTEM CONTROL LOGIC

"RECEIVING" SYSTEM CONTROL LOGIC

MEASUREMENT OF TRANSMISSION QUALITY OF A TELEPHONE CHANNEL

TECHNICAL FIELD OF THE INVENTION

The present invention pertains to apparatus and method for measuring the transmission quality of a telephone line.

BACKGROUND OF THE INVENTION

At present there are many applications for voice processing systems which are interconnected in a wide area telephone network. For example, in one instance of such an application, voice messages are transmitted among voice processing systems, sometimes referred to in the art as voice processing nodes, which are connected to the wide area network over voice grade telephone lines.

As is well known in the art, the process of transmitting a recorded message from a first, sending voice processing system over a voice grade telephone line for re-recording at a second, receiving voice processing system is sensitive to the transmission quality of the voice grade telephone line. For example, any noise, attenuation, or other such transmission impairment will degrade the quality of the re-recorded message and possibly make it difficult to understand. As a result of this, there is a need in the art to be able to measure the amount of certain types of transmission impairments to voice grade telephone lines so that systems which communicate over these lines, for example, voice processing systems, can take appropriate action if the measured transmission impairments exceed predetermined thresholds. One example of an appropriate action includes the sending voice processing system's electing to abort a communication and trying to complete the communication using a different voice grade telephone line.

There presently exist several methods for measuring transmission quality which are known in the art. One example of such a method is to use specific equipment such as transmission impairment measurement sets (TIMS) such as the model HP 4937A test set which is available from Hewlett Packard of Palo Alto, Calif. Another example of such a method is the use of high speed modems which use dial-up, voice grade telephone lines, to perform transmission quality measurements. In fact, such methods sometimes include special apparatus for use in compensating the transmitted signals for the degradations introduced therein by the measured impairments to the voice grade telephone line. Such methods have a serious drawback when they are used with interconnected voice processing systems. This drawback occurs because additional equipment is required and this additional equipment requires the voice processing systems to have added space and, thereby, added cost.

As one can readily appreciate from the above, there is a need in the art for apparatus and method for measuring the transmission quality of telephone channels in a telephone network. Further, there is an additional need for such apparatus and method which can be used in connection with interconnected voice processing systems without adding additional equipment to the voice processing systems and/or to the telephone network.

SUMMARY OF THE INVENTION

Embodiments of the present invention advantageously solve the above-identified problem in the art by providing apparatus and method for measuring the transmission quality of telephone channels in a telephone network. Further, embodiments of the present invention may be incorporated into voice processing systems for use in measuring the transmission quality of telephone lines connected between voice processing systems without adding additional equipment to the voice processing systems and/or to the telephone network. Such embodiments are particularly advantageous because they utilize equipments that already exist in the voice processing systems and, therefore, enable these systems to make transmission impairment measurements without the need for the additional cost or space which is required for additional equipment. In particular, embodiments of the present invention utilize the following apparatus that already exist in voice processing systems: (1) sending apparatus for transmitting pre-defined audio signals comprised of DTMF (TOUCH-TONE) pulses and (2) receiving apparatus for receiving audio signals comprised of DTMF pulses and determining the value thereof.

Specifically, an embodiment of the present invention comprises: means for causing the sending apparatus to transmit a predetermined sequence of DTMF pulses having predetermined amplitude values over a telephone line to the receiving apparatus; means, responsive to the receiving apparatus, for counting the number of received DTMF pulses; and means for comparing the number with a predetermined threshold value, whereby the telephone line is determined to have acceptable transmission quality if the number exceeds the predetermined threshold value.

In a preferred embodiment of the present invention, the predetermined sequence of DTMF pulses comprises four strings of ten (10) DTMF pulses, each of which strings has a succeedingly lower amplitude.

Further, in a preferred embodiment of the present invention, the predetermined sequence of DTMF pulses is not produced by separate hardware such as a DTMF dialing device, but is produced by the standard audio output mechanism of the voice processing system.

BRIEF DESCRIPTION OF THE DRAWING

A complete understanding of the present invention may be gained by considering the following detailed description in conjunction with the accompanying drawing, in which.

DETAILED DESCRIPTION

Figure 1:
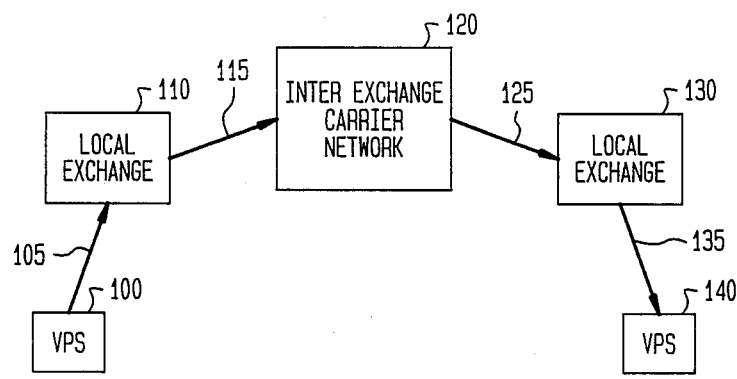
FIG. 1 shows, in pictorial form, a block diagram of the interconnection between a "sending" voice processing system and a "receiving" voice processing system over a wide area network, which two voice processing systems are used to measure the transmission quality of a telephone line connected therebetween.

FIG. 1 shows a block diagram of the interconnection between a "sending" voice processing system (VPS) and a "receiving" voice processing system (VPS) over a wide area network, which two voice processing systems are used to measure the transmission quality of a telephone line connected therebetween. Specifically, as shown in FIG. 1, "sending" VPS 100 sends a voice message to "receiving" VPS 140. VPS 100 dials a telephone number and is connected by means of dial-up telephone line 105 to local exchange 110, for example, a telephone company switching machine. Local exchange 110 is connected, in turn, by inter-exchange carrier network 120, to local exchange 130. Finally, local exchange 130 is connected to receiving VPS 140 by dial-up telephone line 135.

Figure 2:
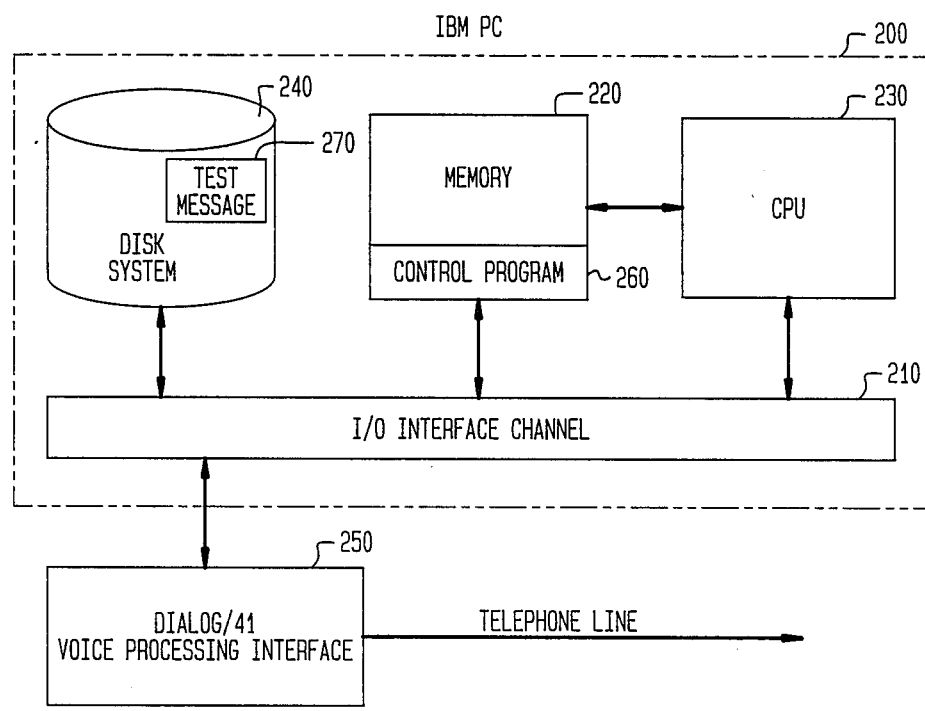
FIG. 2 shows, in pictorial form, a block diagram of a voice processing system which can be used as either the "sending" or the "receiving" voice processing system shown in FIG. 1.

FIG. 2 shows a block diagram of a voice processing system which can be used as either the "sending" or the "receiving" voice processing system shown in FIG. 1. It should be clear to those of ordinary skill in the art that it is advantageous for each voice processing system in a network to have the capability to act as the "sending" and "receiving" voice processing systems. Specifically, as shown in FIG. 2, VPS 100 comprises microcomputer 200 and voice processing interface (VPI) 250 which interfaces between dial-u telephone line 105 and VPS 100. As shown in FIG. 2, microcomputer 200 is an IBM personal computer however, as should be clear to those of ordinary skill in the art, microcomputer 200 may be any suitable computer or processor such as, for example, those computers which are commercially available and which are compatible with the IBM PC. Further, VPS 250 comprises one or more DIALOG/41 Digitized Voice and Telephony Computer Interface circuit boards which are available from Dialogic Corporation, 129 Littleton Rd, Parsippany, N.J. 07054. In pertinent part, VPI 250 is comprised of means for interfacing with the telephone network to send and receive calls; means, such as transformers, to electrically isolate subsequent circuits; and filter circuits.

Figure 3:
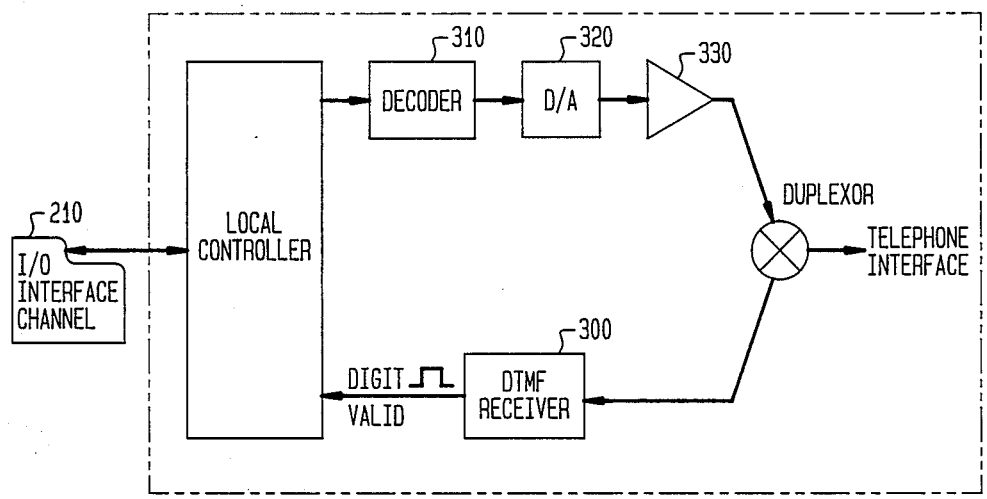
FIG. 3 shows, in pictorial form, a block diagram of a portion of a voice processing interface which comprises a portion of the voice processing system shown in FIG. 2.

FIG. 3 shows a block diagram of a portion of a DIALOGIC/41 Digitized Voice and Telephony Computer Interface circuit, i.e., VPI 250, which comprises a portion of a preferred embodiment of VPS 100 shown in FIG. 2. As shown in FIG. 3, the portion of VPS 250 which is used for "sending" signals out onto telephone line 105 comprises decoder 310, digital-to-analog converter 320 and low pass filter 330. Decoder 310 is comprised of circuitry which is well known to those of ordinary skill in the art for converting data transmitted from microcomputer 200 to digital form; digital-to-analog converter 320 is comprised of circuitry which is well known to those of ordinary skill in the art for converting the digital signals to analog form; and low pass filter 330 is comprised of circuitry which is well known to those of ordinary skill in the art for transmitting the analog signals to band-limited form for transmission onto telephone line 105. It should be clear to those of ordinary skill in the art as to the manner in which apparatus 310-330 operate to send signals out onto telephone line 105.

Further, as shown in FIG. 3, DTMF receiver 300 receives and translates DTMF pulses which are transmitted to VPS 100 over telephone line 105 into digital form for transmission to I/O interface channel 210 of microcomputer 200. As such VPI 250 may be used in VPS 100 and VPS 140 so that each may be a "sending" and a "receiving" voice processing system. Many circuits are commercially available in the art to serve as DTMF receiver 300. For example, in a preferred embodiment of the present invention, one may use DTMF receiver SSI 202P which is commercially available from Silicon Systems, Inc., 14351 Myford Rd, Tustin, Calif. 92680, which DTMF receiver has a minimum receiver sensitivity of −32 dBm per tone.

As shown in FIG. 2, microcomputer 200 is comprised of I/O interface channel 210. I/O interface channel 210 performs: (1) certain interface functions among the various components of microcomputer 200 for transmitting data and commands thereamong in a manner which is well known to those of ordinary skill in the art and (2) certain interface functions between VPI 250 and microcomputer 200 for sending data from microcomputer 200 to VPI 250 and for receiving data at microcomputer 200 from VPI 250 in a manner which is well known to those of ordinary skill in the art. Further, microcomputer 200 is comprised of memory unit 220 which contains control program 260, which control program 260 is used in the manner set forth in detail below to enable "sending" VPS 100 and "receiving" VPS 140 to measure the transmission quality of a telephone line interconnected therebetween.

Still further, microcomputer 200 is comprised of central processing unit 230 which is interconnected with I/O interface channel 210 and memory unit 220 in a manner which is well known to those of ordinary skill in the art. Lastly, microcomputer 200 is comprised of disk system 240 which stores test messages which are used by control program 260 in the manner set forth in detail below.

Note that in this embodiment of the present invention, the test messages which, as will be explained below, contain DTMF pulses, are not produced by separate hardware such as DTMF dialing devices, but they are produced by the normal audio output mechanism of the voice processing system.

All the components of VPS 100 which are shown in FIG. 2 are well known in the art and the manner and means by which they interact are also well known in the art. Further, the manner in which VPS 100 and VPS 140 utilize dial-up telephone lines to form an interconnection between them is well known to those of ordinary skill in the art and it can readily be assumed in the description that follows that such a capability exists and is understood by those of ordinary skill in the art. Still further, it is well known to those of ordinary skill in the art that in order for "sending" VPS 100 and "receiving" VPS 140 to communicate, they need to follow a logical interconnection procedure to ensure proper communication therebetween. Such a logical interconnection procedure is referred to in the art as a "protocol." Such protocols are well known to those of ordinary skill in the art and they usually include several logical sequences of operations, often referred to as layers, which are defined, for example, by the Open Systems Interconnection model which may be obtained from the International Standards Organization.

In particular, one part of such an interconnection protocol is referred to in the art as a session protocol. Further, one part of the session protocol which is pertinent to the present invention is concerned with determining whether or not a reliable communication can occur over the communications channel which has been established or set-up. Embodiments of the present invention are used to make this determination.

Figure 4:
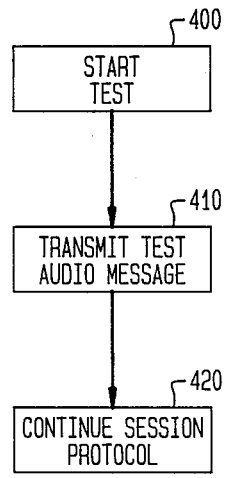
FIG. 4 shows a flow chart of the control logic for the "sending" voice processing system shown in FIG. 1.
Figure 5:
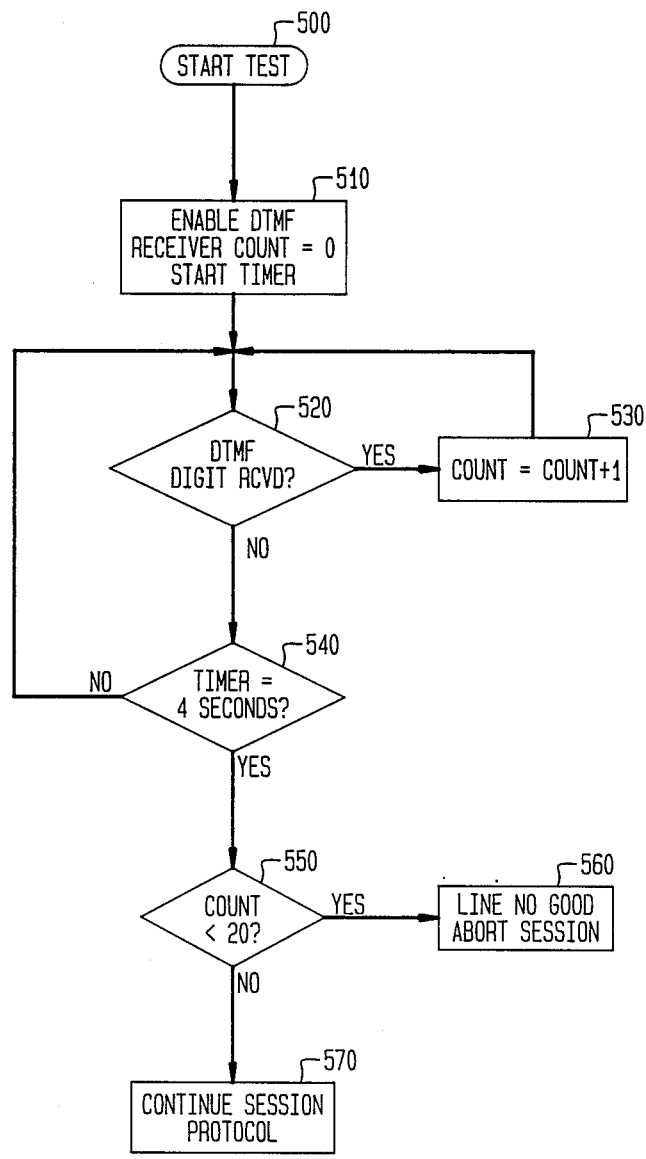
FIG. 5 shows a flow chart of the control logic for the "receiving" voice processing system shown in FIG. 1.

The following describes the steps that are followed by "sending" VPS 100 and by "receiving" VPS 140 in performing the measurement of the transmission quality of a telephone line connected therebetween in accordance with the present invention. First, at an appropriate stage of the session protocol, "sending" VPS 100 operates so that "sending" control program 260 in "sending" memory unit 220 is loaded into "sending" cpu 230 and executed by "sending" microcomputer 200. Second, "receiving" VPS 140 operates so that "receiving" control program 260 is loaded into "receiving" cpu 230 and executed by "receiving" microcomputer 200. FIG. 4 shows a flow chart of the control logic for "sending" control program 260 and FIG. 5 shows a flow chart of the control logic for "receiving" control program 260.

For the purposes of this description, the terms "sending" and "receiving" are used to refer to the two voice processing systems or nodes between which a voice message is to be passed. All amplitude or power measurements refer to the 600 ohm telephone line. Further, before discussing the specifics of how "sending" VPS 100 and "receiving" VPS 140 measure the quality of a telephone line connected therebetween in accordance with a preferred embodiment, we will discuss how they operate in general to perform this function.

At the point in a session protocol where transmission quality is to be determined, "receiving" VPS 140 is conditioned to receive DTMF digits by means of, for example, DTMF receiver 300 in VPI 250. "Sending" VPS 100 then transmits a pre-defined audio test message which is stored, for example, as test message 270 in disk system 240 of microcomputer 200. VPS 100 transmits the predefined test message in a manner well known to those of ordinary skill in the art by using decoder 310, D/A 320 and low pass filter 330 in "sending" VPI 250. It should be noted that this is the same process which is used by VPS 100 to playback recorded audio messages to users of the system.

The pre-defined stored audio test message is a precisely generated audio signal which contains a series of DTMF pulses where, for example, the first ten (10) DTMF pulses have a first pre-determined amplitude and each subsequent group of ten (10) DTMF pulses have a sequentially diminishing amplitude.

"Receiving" VPS 140, and, in particular, VPI 250 thereof, detects these pulses and transmits digital representations of the received pulses to microcomputer 200 of "receiving" VPS 140. Microcomputer 200 of "receiving" VPS 140 counts the number of DTMF pulses it receives during a predetermined time interval and compares the number of received DTMF pulses with a predetermined value. If the number of DTMF pulses received is less than the predetermined value, then "receiving" VPS 140 determines that the telephone line is of unsuitable transmission quality and indicates such to "sending" VPS 100 by means of a predetermined protocol message. For example, the information indicating poor transmission quality can be transmitted, for example, by means of an explicit message or by means of a refusal to provide a proper acknowledgment.

In a particular case, the predetermined value or threshold used by "receiving" VPS 140 to determine the suitability of the telephone line for voice transmission is based on various parameters such as, for example: (1) the sensitivity of DTMF receiver 300 in VPI 250 of "receiving" VPS 140; (2) the content of the predefined DTMF audio test message transmitted by "sending" VPS 100; and (3) the level of line quality required by the network design to allow adequate voice transmission quality, which level of line quality may be determined empirically by, for example, trial and error.

Since one can make independent measurements of "sending" VPS 100 sensitivity and "receiving" VPS 140 sensitivity, in general, the number of DTMF digits received by "receiving" VPS 140 will be a function of the characteristics of the telephone line used for communication therebetween. Those of ordinary skill in the art will readily appreciate that impairments such as, for example, attenuation, noise and roll-off, will reduce the number of DTMF pulses that are received by VPS 140. As a result, and in accordance with the inventive method, the number of received DTMF pulses indicates the general quality of the telephone line which is used as an audio transmission medium.

It is preferred that the resultant line audio of the predefined DTMF audio test message should be the same for all "sending" voice processing systems connected to a wide area network, however, since the sensitivity of the DTMF receivers, for example, DTMF receiver 300, of different brands of "receiving" voice processing systems connected to the wide area network may be different, the threshold value used by each receiving system may be adjusted to compensate for its own particular DTMF receiver sensitivity.

In a preferred embodiment of the present invention, the predefined test audio message comprises four groups of ten (10) DTMF pulses having four discrete amplitude levels which are shown in Table I. As a result, in the preferred embodiment, a total of forty (40) DTMF pulses are transmitted by "sending" VPS 100 in accordance with the present invention. Since each DTMF pulse has a duration of approximately 50 msec and has a delay of approximately 50 msec between pulses, the duration of the preferred test sequence is approximately 4 seconds.

TABLE I

| Group | Amplitude per tone | Digits |
|---|---|---|
| 1 | −20 dBm | *86A1*86A1 |
| 2 | −24 dBm | *86A1*86A1 |
| 3 | −28 dBm | *86A1*86A1 |
| 4 | −32 dBm | *86A1*86A1 |

In a preferred embodiment of the present invention, the predefined test message 270 is stored on disk system 240 of microcomputer 200 through use of a computer program which produces a data file which contains the encoded waveforms required. This computer program takes as its input the desired amplitudes, durations, and frequencies for each tone pulse, and produces as output the data file 270 on disk system 240. This computer program computes the required sequence of output samples for each DTMF pulse using the equation:

For i=1 to T $$\text{Output}(i) = A(\sin(2\pi F1) + \sin(2\pi F2))$$

where
Output(i) is the individual output sample
i is the ith time increment of the sampling interval
T is desired duration of the tone
A is the desired amplitude of the tone F1 and F2 are the frequencies of the desired DTMF tone being generated In a preferred embodiment of the present invention, the predetermined threshold for determining whether or not the transmission quality of the telephone line is acceptable for communication is twenty (20). As a result, if "receiving" VPS 140 detects fewer than 20 DTMF pulses from the pre-defined sequence of 40 DTMF pulses, the telephone line either has more than 8 dB attenuation, −36 dBm noise level, 10 dB variation in frequency response, or some combination of these transmission impairments. Nevertheless, and in any case, if less than 20 DTMF pulses from the test sequence are received, the telephone line is considered to be unsuitable for use.

FIG. 4 shows a flow chart of the control logic for "sending" control program 260. As shown in FIG. 4, the transmission quality measurement test starts at box 400. Up to this point in time, "sending" VPS 100 and "receiving" VPS 140 have been attempting to establish a connection and have reached a point in the session protocol where they need to measure the transmission quality of the telephone line connected therebetween. At box 400, "sending" control program 260 is accessed from "sending" memory 220 and test sequence 270 is retrieved from "sending" disk system 240. Then at box 410, microcomputer 200 transmits test sequence 270 to VPI 250 which, in turn, transmits test sequence 270 over the telephone line to "receiving" VPS 140. After test message 270 has been transmitted, as shown in box 420, "sending" control program 260 returns to the portion of microcomputer 200 which is engaged in the session protocol and which is well known to those of ordinary skill in the art.

FIG. 5 shows a flow chart of the control logic for "receiving" control program 260. As shown in FIG. 5, the transmission quality measurement test starts at box 500. At box 500, "receiving" control program 260 is accessed from "receiving" memory 220 and control is transferred to box 510 where certain initialization steps are carried out. As indicated by box 510, DTMF receiver 300 in "receiving" VPI 250 is enabled, a counter in microcomputer 200, i.e., COUNT, is set to zero, and a timer is started. COUNT represents the number of DTMF pulses which have been received by "receiving" VPI 250 since the timer has been initialized. Then the program in microcomputer 200 transfers control to decision box 520.

Decision box 520 represents a point in "receiving" control program 260 at which "receiving" microcomputer 200 queries whether or not VPI 250 has received a DTMF pulse and has transmitted a digital representation of that DTMF pulse to microcomputer 200. If "receiving" control program 260 in "receiving" microcomputer 200 determines that a DTMF pulse has been received, then "receiving" control program 260 in microcomputer 200 transfers control to the part of "receiving" control program 260 which corresponds to box 530 to increment COUNT by 1 and, thereafter, to transfer control back to box 520 to await the receipt of the next DTMF pulse. If, however, no DTMF pulse has been received, "receiving" control program 260 in microcomputer 200 transfers control to the portion of the program which corresponds to decision box 540. Note that in this preferred embodiment of the present invention, because DTMF pulses are being received, "receiving" control program 260 does not have to check to see if the received pulses conform to the pre-defined test sequence. This is because there is very little chance that transmission impairments will create a substitution error whereby one DTMF pulse is altered to represent another. As a consequence, "receiving" control program 260 may simply count received pulses and it does not have to compare the values with the expected pulses from the test sequence. However, if pulses other than DTMF pulses were used, there might be a need to compare the received pulses with the expected values in the predefined test sequence.

Decision box 540 represents a point in "receiving" control program 260 at which microcomputer 200 determines whether or not the test interval has expired. For example, as shown in FIG. 5, if the timer in "receiving" microcomputer 200 has not reached 4 seconds since initialization at box 510, then control is transferred back to box 520 of "receiving" control program 260 to await the receipt of more DTMF pulses. However, if the timer has reached 4 seconds, in this specific example, then control is transferred to the portion of "receiving" control program 260 that corresponds to decision box 550.

Decision box 550 represents a point in "receiving" control program 260 at which microcomputer 200 determines whether or not the number of DTMF pulses received from "sending" VPS 100 exceeds the predetermined threshold value. If, as shown in FIG. 5, COUNT is less than 20, then control is transferred to the portion of "receiving" control program 260 which corresponds to box 560 to take appropriate action corresponding to the fact that VPS 140 considers the line to be unsuitable for telephone transmission. If, however, COUNT is at least as large as 20, then, in this embodiment, VPS 140 considers the line to be suitable for telephone communication, and "receiving" control program 260, as shown in box 570, returns to the portion of microcomputer 200 which is engaging in the session protocol and which portion is well known to those of ordinary skill in the art.

Box 560 represents a point in "receiving" control program 260 at which microcomputer 200 has determined that the telephone line is unsuitable for communication and microcomputer 200 may then take any one of a number of steps for communicating that fact to VPS 100 which are well known to those of ordinary skill in the art. For example, VPS 140 may abort the protocol or it may send a message to VPS 100 to the effect that the telephone line is unsuitable for use in accordance with methods well known to those of ordinary skill in the art.

As should be clear to those of ordinary skill in the art, further embodiments of the present invention may be made without departing from its teachings. For example, embodiments of the present invention may be comprised of "sending" and "receiving" apparatus which are dedicated to those functions as compared with the voice processing systems which are capable of performing both functions as was described above. As a further example, the predefined sequence of pulses can have an arbitrary sequence of amplitudes.

What is claimed is:

1. Apparatus for measuring the transmission quality of a transmission medium connected between a sending apparatus for sending pre-defined audio signals comprised of DTMF (TOUCH-TONE) pulses and a receiving apparatus for receiving audio signals comprised of DTMF pulses and determining the value thereof, which apparatus comprises:

means for causing the sending apparatus to transmit a predetermined sequence of DTMF pulses having predetermined amplitude values over the transmission medium to the receiving apparatus;

means, responsive to the receiving apparatus, for counting the number of received DTMF pulses; and means for comparing the number with a predetermined threshold value, whereby the transmission medium is determined to have acceptable transmission quality if the number exceeds the predetermined threshold value.

2. The apparatus of claim 1 wherein the predetermined sequence of DTMF pulses comprises groups of predetermined sequences, each succeeding group having a succeedingly lower amplitude.

3. The apparatus of claim 2 wherein the predetermined sequence of DTMF pulses comprises four groups of ten DTMF pulses each.

4. The apparatus of claim 3 wherein each of the four groups of ten DTMF pulses comprises the following sequence of ten DTMF pulses: *86A1*86A1.

5. The apparatus of claim 1 wherein the counting means comprises means for determining and counting the number of received pulses which conform to the predetermined sequence.

6. Method for measuring the transmission quality of a transmission medium connected between a sending apparatus for sending pre-defined audio signals comprised of DTMF (TOUCH-TONE) pulses and a receiving apparatus for receiving audio signals comprised of DTMF pulses and determining the value thereof, which method comprises the steps of:

causing the sending apparatus to transmit a predetermined sequence of DTMF pulses having predetermined amplitude values over the transmission medium to the receiving apparatus;

counting the number of DTMF pulses which are received by the receiving apparatus; and comparing the number with a predetermined threshold value, whereby the transmission medium is determined to have acceptable transmission quality if the number exceeds the predetermined threshold value.

7. The method of claim 6 wherein the predetermined sequence of DTMF pulses comprises groups of predetermined sequences, each succeeding group having a succeedingly lower amplitude.

8. The method of claim 7 wherein the predetermined sequence of DTMF pulses comprises four groups of ten DTMF pulses each.

9. The method of claim 8 wherein each of the four groups of ten DTMF pulses comprises the following sequence of ten DTMF pulses: *86A1*6A1.

10. The method of claim 6 wherein the step of counting comprises determining and counting the number of DTMF pulses which are received by the receiving apparatus which conform to the predetermined sequence.

11. Apparatus for measuring the transmission quality of a transmission medium connected between a sending apparatus for sending pre-defined audio signals comprised of DTMF (TOUCH-TONE) pulses and a receiving apparatus for receiving audio signals comprised of DTMF pulses and determining the value thereof, which apparatus comprises:

means, responsive to the receiving apparatus, for counting the number of received DTMF pulses from a predetermined sequence of DTMF pulses having predetermined amplitude values which were transmitted over the transmission medium to the receiving apparatus; and means for comparing the number with a predetermined threshold value, whereby the transmission medium is determined to have acceptable transmission quality if the number exceeds the predetermined threshold value.

12. Method for measuring the transmission quality of a transmission medium connected between a sending apparatus for sending pre-defined audio signals comprised of DTMF (TOUCH-TONE) pulses and a receiving apparatus for receiving audio signals comprised of DTMF pulses and determining the value thereof, which method comprises the steps of:

counting the number of DTMF pulses which are received from a predetermined sequence of DTMF pulses having predetermined amplitude values which were transmitted over the transmission medium to the receiving apparatus; and comparing the number with a predetermined threshold value, whereby the transmission medium is determined to have acceptable transmission quality if the number exceeds the predetermined threshold value.

* * * * *